(12) United States Patent
　　　Oura

(10) Patent No.: US 9,292,772 B2
(45) Date of Patent: Mar. 22, 2016

(54) IMAGE PROCESSING APPARATUS FOR PAPER-CARVING ART

(71) Applicant: KYOCERA Document Solutions Inc., Osaka-shi, Osaka (JP)

(72) Inventor: Junichi Oura, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/631,656

(22) Filed: Feb. 25, 2015

(65) Prior Publication Data

US 2015/0242729 A1　　Aug. 27, 2015

(30) Foreign Application Priority Data

Feb. 27, 2014　(JP) ................................. 2014-037487

(51) Int. Cl.
　　*G06F 3/12*　　(2006.01)
　　*G06K 15/02*　　(2006.01)
　　*G06F 19/00*　　(2011.01)

(52) U.S. Cl.
　　CPC ........ *G06K 15/1868* (2013.01); *G06K 15/1822* (2013.01); *G06K 15/1856* (2013.01)

(58) Field of Classification Search
　　CPC combination set(s) only.
　　See application file for complete search history.

(56) References Cited

U.S. PATENT DOCUMENTS

| 8,792,142 | B2 * | 7/2014 | Hannaway | ........ G06F 17/30286 358/3.28 |
| 2009/0147280 | A1 * | 6/2009 | Yamaguchi | .......... B41J 11/0065 358/1.9 |
| 2013/0321876 | A1 * | 12/2013 | Nagai | ................ H04N 1/00557 358/461 |
| 2014/0293376 | A1 * | 10/2014 | Tokura | ............. H04N 1/001795 358/498 |
| 2015/0124295 | A1 * | 5/2015 | Yamane | ............. G06K 15/1889 358/2.1 |

FOREIGN PATENT DOCUMENTS

JP　　　11240298 A　　9/1999

* cited by examiner

*Primary Examiner* — Barbara Reinier
*Assistant Examiner* — Henok A Shiferaw
(74) *Attorney, Agent, or Firm* — Alleman Hall McCoy Russell & Tuttle LLP (57) ABSTRACT

An image processing apparatus includes a detecting portion, a correspondence setting portion, a piling order determining portion, and a print data generating portion. The detecting portion detects color information based on image data. The correspondence setting portion determines respective colors of a plurality of paper sheets to be used in creation of a material M based on the color information, and associates the determined colors with respective section image regions which are made by the read image being sectioned based on the color information. The piling order determining portion determines a piling order of paper sheets having those colors. The print data generating portion generates print data of an image that includes cutting lines for each of paper sheets composing the material M1. A control portion causes an image forming portion to form line images indicating the cutting lines based on the print data in accordance with the piling order.

6 Claims, 9 Drawing Sheets

| SECTION IMAGE REGION | COLOR OF SECTION IMAGE REGION | KIND (COLOR) OF PAPER SHEET | PILING ORDER |
|---|---|---|---|
| R1 | LIGHT BLUE | BLUE | 4 (UPPERMOST LAYER) |
| R2 | BROWN | BROWN | 3 |
| R3 | DARK GREEN | GREEN | 2 |
| R4 | VERMILION | RED | 1 (LOWEST LAYER) |

IMAGE PROCESSING APPARATUS FOR PAPER-CARVING ART

INCORPORATION BY REFERENCE

This application is based upon and claims the benefit of priority from the corresponding Japanese Patent Application No. 2014-037487 filed on Feb. 27, 2014, the entire contents of which are incorporated herein by reference.

BACKGROUND

The present disclosure relates to an image processing apparatus that automatically performs a part of operations in creation of a piece of work which is three-dimensionally expressed in the thickness direction of a material in the field of art where each paper sheet of the material made by a plurality of kinds of paper sheets having different colors and/or densities being piled in a form of a stack is partially cut out in accordance with a design or a picture.

In the fields of fine arts and hobbies, there has been proposed an art of making a three-dimensional colorful piece of work by partially cutting out, in accordance with a design or a picture, each paper sheet of a material made by a plurality of kinds of paper sheets having different colors and/or densities being piled. This kind of art is called paper-carving art, and will be referred to as paper-carving art herein. The paper-carving art is performed in the following procedure. First, a creator of such paper carving art selects a draft from among drafts prepared in advance, or draws a desired picture pattern on a paper sheet himself/herself. Next, the creator decides colors for respective parts in the picture pattern, prepares paper sheets that correspond to the colors, decides the order in which the respective parts are to be cut out, and piles paper sheets or drafts in the piling order corresponding to the cutting-out order, to create a material. Then, in accordance with the cutting-out order, the creator cuts out the piled paper sheets with a cutter or the like along cutting lines drawn on each paper sheet of the material.

SUMMARY

An image processing apparatus according to one aspect of the present disclosure is an image processing apparatus configured to create a material in a form of a stack made by a plurality of paper sheets being piled so as to be used in production of a piece of work, the piece of work being made by each of the plurality of paper sheets being cut out along cutting lines formed thereon. The image processing apparatus includes a detecting portion, a correspondence setting portion, a piling order determining portion, and a print data generating portion. The detecting portion detects, based on obtained image data, at least one of color information and density information included in the image data. The correspondence setting portion sets correspondence between each of a plurality of section image regions which are made by an image, indicated by the image data, being sectioned based on the information detected by the detecting portion, and either one or both of a color and a density of each of a plurality of paper sheets to be used in creation of the material. The piling order determining portion determines, based on a condition defined in advance, a piling order for a case where paper sheets having either one or both of the colors and the densities whose correspondence with the respective section image regions has been set by the correspondence setting portion are to be used in the material. The print data generating portion generates, for each paper sheet to be used in the material, print data that includes line images indicating cutting lines in accordance with the piling order defined based on borders of the respective section image regions and determined by the piling order determining portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. It should be noted that the embodiments described below are merely specific examples of the present disclosure, and do not limit the technical scope of the present disclosure. First, a schematic structure of an image processing apparatus 1 according to an embodiment of the present disclosure will be described with reference to FIG. 1.

Figure 1:
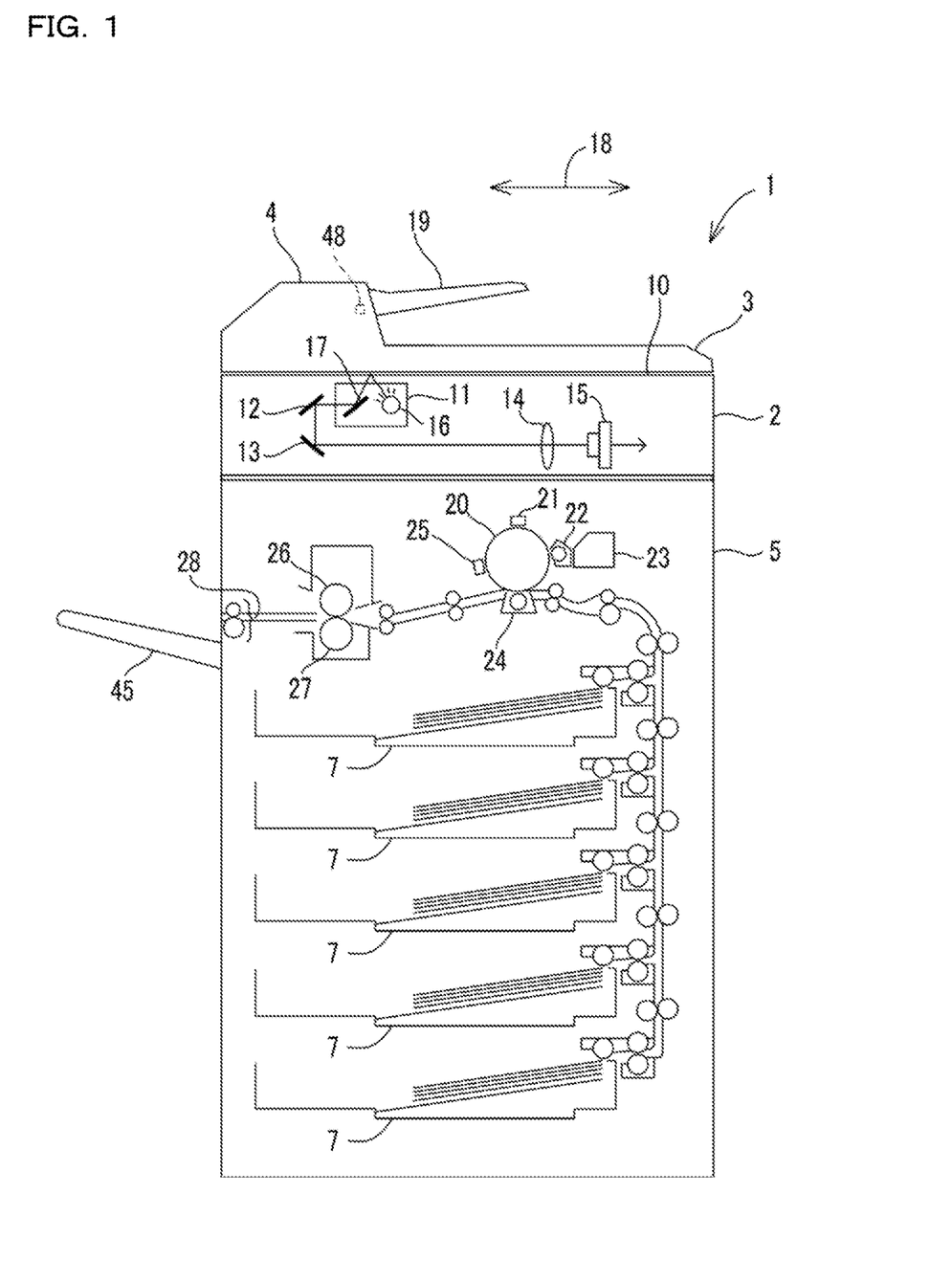
FIG. 1 shows a structure of an image processing apparatus according to an embodiment of the present disclosure.

The image processing apparatus 1 is a multifunction peripheral having an image reading function, a facsimile function, an image forming function, and the like. As shown in FIG. 1, the image processing apparatus 1 includes an image reading portion 2, a document sheet cover 3, an automatic document sheet feeder 4 (hereinafter, referred to as ADF 4), an image forming portion 5, and sheet feed cassettes 7. In the following, as one example of an image processing apparatus according to the present disclosure, the image processing apparatus 1 being a multifunction peripheral will be described. However, the present disclosure is not limited thereto. For example, a printer, a facsimile device, a copying machine, or a scanner device also corresponds to the image processing apparatus according to the present disclosure.

The image reading portion 2 executes an image reading process of reading image data from a document sheet. As shown in FIG. 1, the image reading portion 2 includes a contact glass 10, a reading unit 11, mirrors 12 and 13, an optical lens 14, a CCD (Charge Coupled Device) 15, and the like.

The reading unit 11 includes an LED light source 16 and a mirror 17, and is configured to be movable in a secondary scanning direction 18 (left-right direction in FIG. 1) by a moving mechanism (not shown) using a drive motor such as a stepping motor. When the reading unit 11 is moved in the secondary scanning direction 18 by the drive motor, light emitted from the LED light source 16 toward the contact glass 10 provided on the top surface of the image reading portion 2 scans in the secondary scanning direction 18.

When light is applied from the LED light source 16, the mirror 17 reflects, toward the mirror 12, light reflected by a document sheet or the reverse surface of the document sheet cover 3. The light reflected by the mirror 17 is guided to the optical lens 14 by the mirror 12 and the mirror 13. The optical lens 14 collects the light incident thereon, to be incident on the CCD 15.

Figure 2:
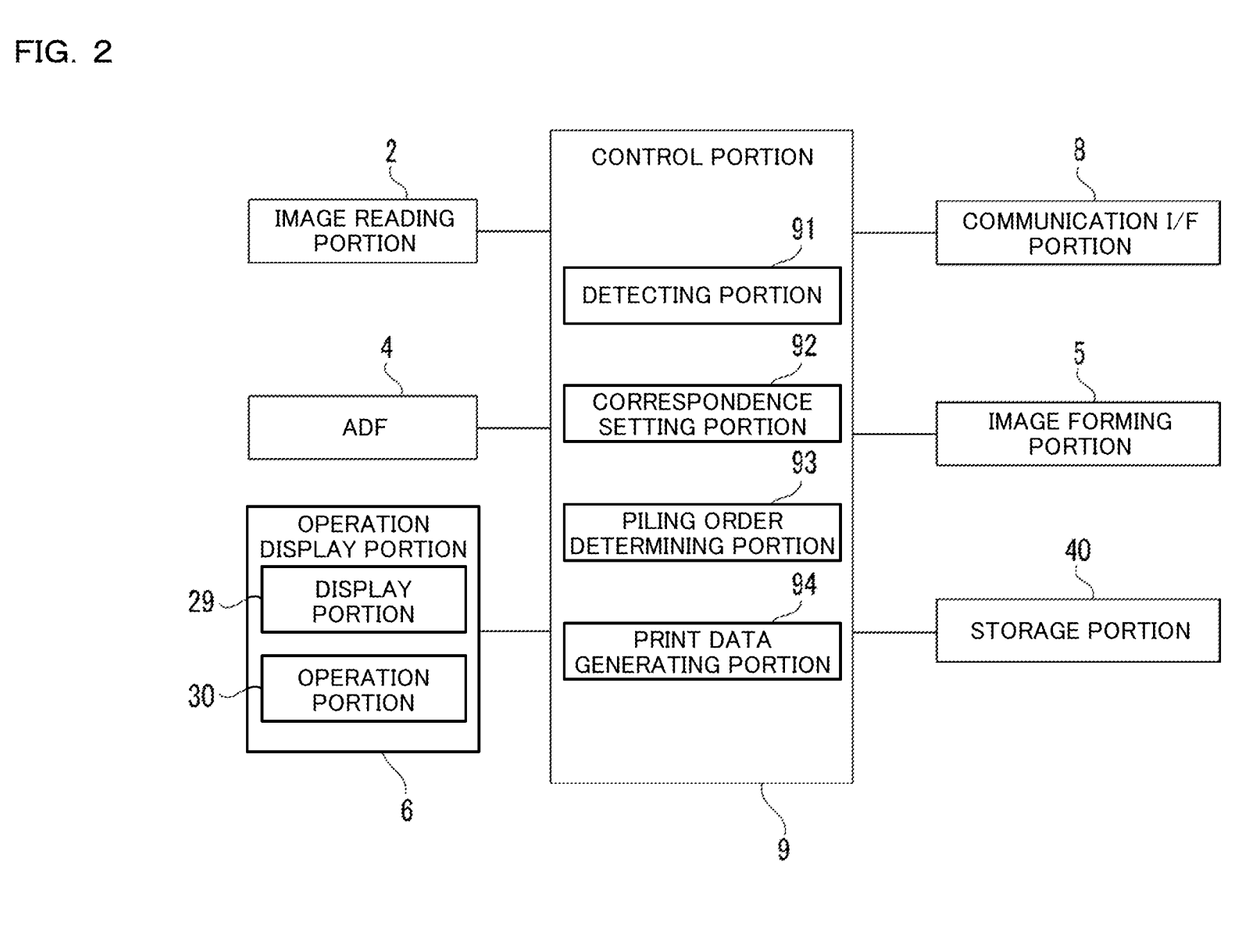
FIG. 2 is a block diagram showing a configuration of the image processing apparatus.

The CCD 15 is a photoelectric converter that converts the received light to an electric signal (voltage) according to the amount of the received light (intensity of brightness), to output the electric signal to a control portion 9 (see FIG. 2). The control portion 9 generates image data of the document sheet by subjecting the electric signal from the CCD 15 to image processing. In the present embodiment, an exemplary case where the CCD 15 is used as an imaging device is described. However, instead of the reading mechanism using the CCD 15, a reading mechanism that uses a contact image sensor (CIS) having a focal length shorter than that of the CCD 15 may be used.

To the image reading portion 2, the document sheet cover 3 is pivotably provided. By the document sheet cover 3 being operated to pivot, the contact glass 10 on the top surface of the image reading portion 2 is opened or closed. In a pivoting support portion of the document sheet cover 3, a cover-opening detection sensor (not shown) such as a limit switch is provided. When a user opens the document sheet cover 3 such that an image of a document sheet is read, the cover-opening detection sensor is actuated to output a detection signal (cover-opening detection signal) to the control portion 9.

The image reading portion 2 reads an image of a document sheet in the following procedure. First, the document sheet is placed on the contact glass 10, and the document sheet cover 3 is then caused to be in a closed position. Thereafter, when an image reading instruction is inputted through an operation display portion 6 (see FIG. 2), one line of light is sequentially applied continuously from the LED light source 16 while the reading unit 11 is being moved rightward in the secondary scanning direction 18. Light reflected by the document sheet or the reverse surface of the document sheet cover 3 is guided to the CCD 15 via the mirrors 17, 12, and 13, and the optical lens 14, and light amount data based on the amount of light received by the CCD 15 is sequentially outputted to the control portion 9. When light amount data for the entirety of the region to which light has been applied is obtained, the control portion 9 processes the light amount data, to generate image information of the document sheet based on the light amount data.

The CCD 15 includes a plurality of pixels. The control portion 9 generates clock signals such as, for example, a timing signal for integration start/end (exposure start/end), a reading control signal (horizontal synchronization signal, vertical synchronization signal, transfer signal, and the like) for a received light signal of each pixel, and outputs these signals to the CCD 15, thereby to control outputting operation of a pixel signal by each pixel.

The ADF 4 is provided in the document sheet cover 3. The ADF 4 sequentially conveys one or more document sheets set on a document sheet set portion 19, by means of a plurality of conveying rollers, and moves the document sheet rightward in the secondary scanning direction 18 through an automatic document sheet reading position defined on the contact glass 10. When the document sheet is moved by the ADF 4, the reading unit 11 is positioned below the automatic document sheet reading position, and an image of the document sheet being moved is read by the reading unit 11 at this position.

The image forming portion 5 executes an image forming process (printing process) by electrophotography according to image information read by the image reading portion 2 or a printing job inputted from an external information processing apparatus such as a personal computer. Specifically, the image forming portion 5 includes a photosensitive drum 20, a charging portion 21, a developing portion 22, a toner container 23, a transfer roller 24, an electricity removing portion 25, a fixing roller 26, a pressure roller 27, and the like. In the present embodiment, the image forming portion 5 using electrophotography is illustrated. However, the image forming portion 5 is not limited to an image forming portion using electrophotography, and may be an image forming portion using an inkjet recording mode, or an image forming portion using another recording mode or printing mode.

In the image forming portion 5, an image forming process on a print sheet fed by the sheet feed cassette 7 is performed in the following procedure. First, when a printing job including a print instruction is inputted, the photosensitive drum 20 is uniformly charged at a predetermined potential by the charging portion 21. Subsequently, light based on image information included in the printing job is applied to the surface of the photosensitive drum 20 by a laser scanning unit (not shown). Thus, an electrostatic latent image is formed on the surface of the photosensitive drum 20. The electrostatic latent image on the photosensitive drum 20 is developed (visualized) into a toner image by the developing portion 22. Toner (developer) is additionally supplied to the developing portion 22 from the toner container 23. Subsequently, the toner image formed on the photosensitive drum 20 is transferred to the print sheet by the transfer roller 24. Thereafter, the toner image having been transferred to the print sheet is heated and fused by the fixing roller 26, to be fixed onto the print sheet, when the print sheet passes between the fixing roller 26 and the pressure roller 27 and is discharged. Potential of the photosensitive drum 20 is removed by the electricity removing portion 25.

The paper sheet having been subjected to the fixing process by the fixing roller 26 and the pressure roller 27 is discharged on a discharge tray 45 by a discharge roller pair 28. In the present embodiment, when printing is continuously performed on a plurality of paper sheets, the paper sheets are piled in order from the bottom, with their printed surfaces facing upward.

As shown in FIG. 2, a communication I/F portion 8 is an interface configured to perform data communication with an external device such as a computer connected to the image processing apparatus 1 via a communication network such as the Internet or a LAN. A storage portion 40 is formed by a storage portion such as a hard disk drive (HDD) or the like. In the present embodiment, in the storage portion 40, paper sheet information is stored in advance. In the present embodiment, the paper sheet information is information of a plurality of kinds of paper sheets of different colors provided in the image processing apparatus 1. For example, when paper sheets of colors "blue", "brown", "green", "red", "yellow", "white", "black", and "purple" are provided in the image processing apparatus 1, information of the paper sheets of these colors is the paper sheet information.

The operation display portion 6 includes a display portion 29 and an operation portion 30. The display portion 29 is formed by a color liquid crystal display, for example, and displays various kinds of information for the user who operates the operation display portion 6. The operation portion 30 is formed by various kinds of press button keys disposed adjacent to the display portion 29, a touch panel sensor disposed on the display screen of the display portion 29, and the like. To the operation portion 30, various kinds of instructions are inputted by the user of the image processing apparatus 1. When the user performs an operation on the operation display portion 6 in order to cause an image reading operation or an image forming operation to be executed, an operation signal caused by that operation is outputted from the operation display portion 6 to the control portion 9.

The control portion 9 includes a CPU, a ROM, and a RAM. The CPU is a processor configured to execute various kinds of calculation processes. The ROM is a nonvolatile storage portion in which information such as a control program for causing the CPU to execute various kinds of processes is stored in advance. The RAM is a volatile storage portion to be used as a temporary storage memory (work area) for various kinds of processes executed by the CPU. By the CPU executing programs stored in the ROM, the control portion 9 controls operations of the respective portions.

Figure 3:
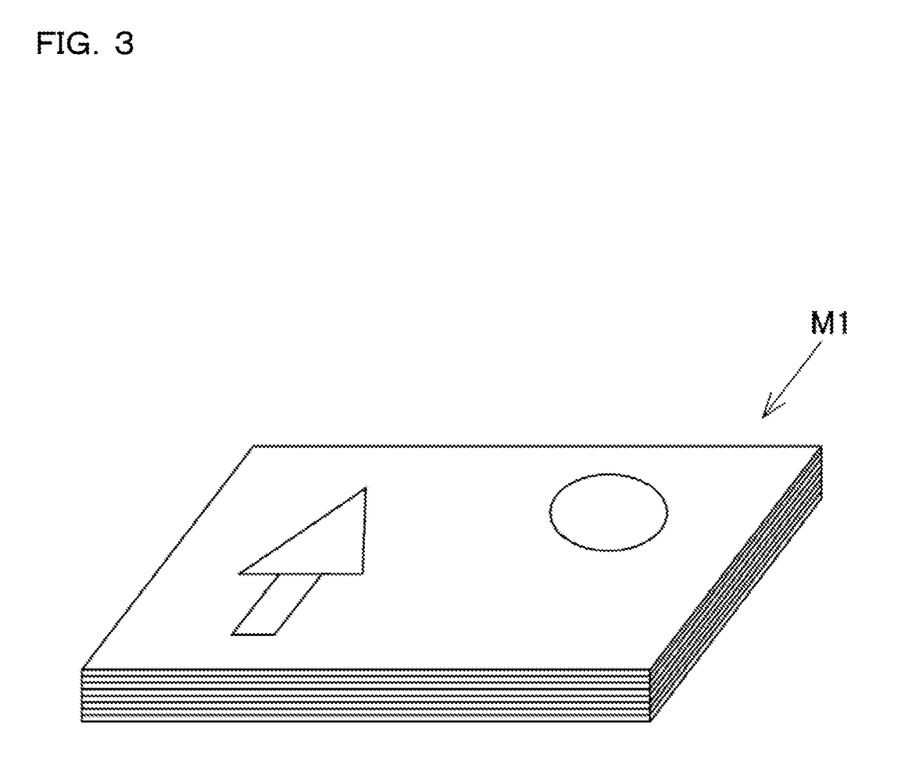
FIG. 3 is a perspective view of a material.

In the fields of fine arts and hobbies, there has been proposed a so-called paper-carving art of making a three-dimensional colorful piece of work by partially cutting out, in accordance with a design or a picture, each paper sheet of a material M1 (see FIG. 3) made by a plurality of kinds of paper sheets having different colors and/or densities being piled. In the paper-carving art, first, a creator selects a draft from among drafts prepared in advance, or draws a desired picture pattern on a paper sheet himself/herself. Next, the creator decides colors for respective parts in the picture pattern, prepares paper sheets that correspond to the colors, decides the order in which the respective parts are to be cut out, and piles paper sheets or drafts in the piling order corresponding to that cutting-out order, to create the material M1. Then, in accordance with the cutting-out order, the creator cuts out the piled paper sheets with a cutter or the like along cutting lines drawn on each paper sheet of the material M1.

However, conventionally, the creator has no other choice than to select a draft from drafts prepared in advance, or to draw a desired picture pattern on a paper sheet himself/herself. When the creator selects a draft from among drafts prepared in advance, the degree of freedom for selecting a picture pattern is low. When the creator draws a desired picture pattern on a paper sheet himself/herself, it takes the creator a lot of effort and time in creating the material. Thus, in order to contribute to making the paper-carving art easily enjoyable for the user, the image processing apparatus 1 has the following configuration.

The image processing apparatus 1 has a function of creating a material in a form of a stack made by a plurality of paper sheets being piled so as to be used in production of a piece of work, the piece of work being made by each of the plurality of paper sheets being cut out along cutting lines formed thereon. Moreover, the image processing apparatus 1 according to the present embodiment has a function of reading a desired image and creating the material M1 based on the read image. In the following description, the expression of an upper layer and a lower layer relative to paper sheets included in the material M1 is on the premise that the surface of each paper sheet with cutting lines representing the draft or the picture pattern printed thereon faces upward. The printed surface side corresponds to an upper layer, and the reverse side of the printed surface corresponds to a lower layer.

By the CPU executing programs, the control portion 9 realizes a detecting portion 91, a correspondence setting portion 92, a piling order determining portion 93, and a print data generating portion 94 as shown in FIG. 2.

Figure 4:
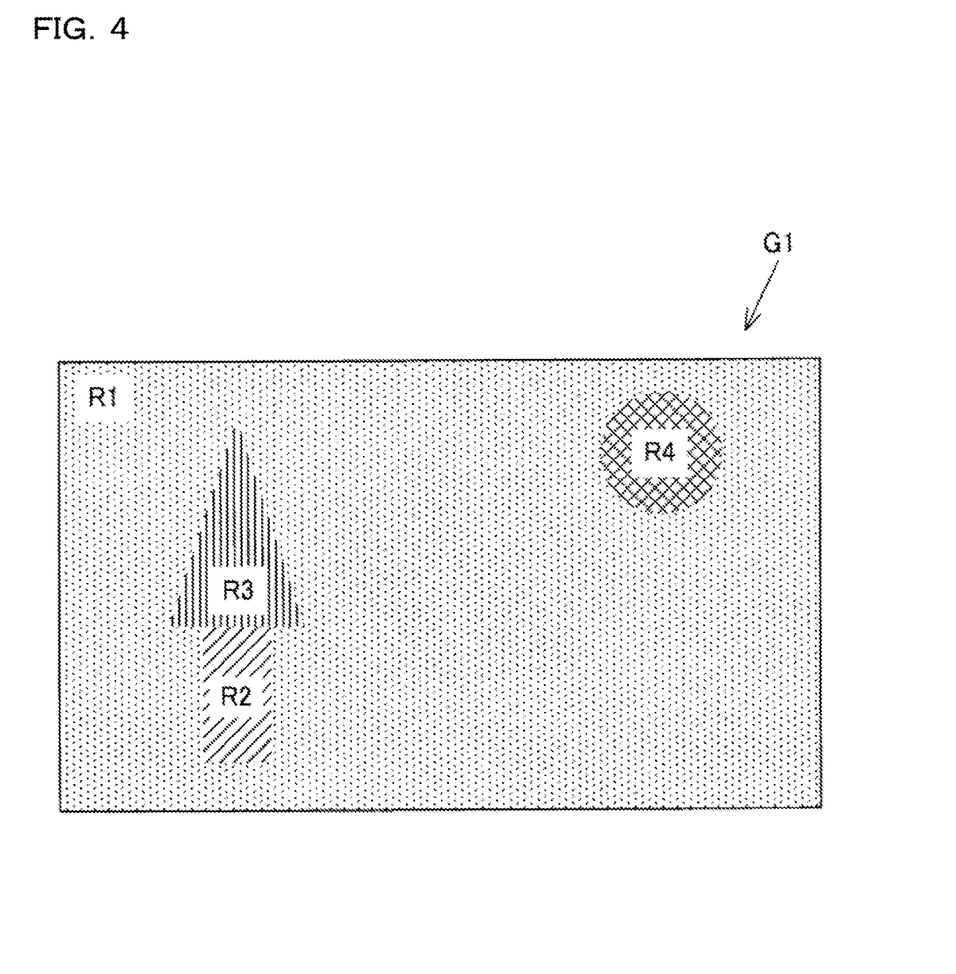
FIG. 4 shows one example of an image read by an image reading portion.
Figure 5:
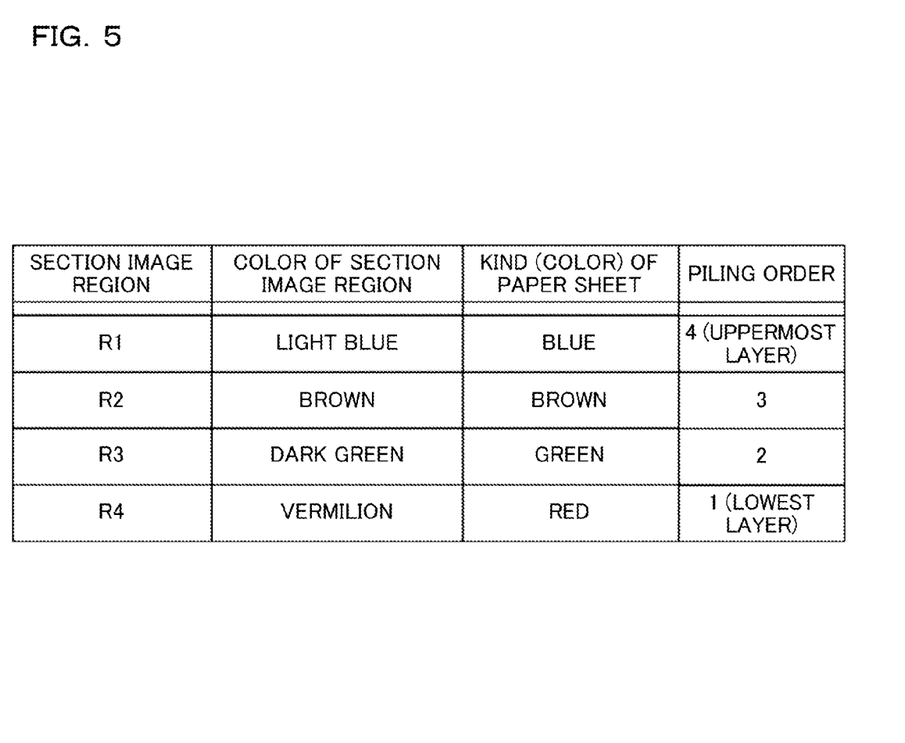
FIG. 5 is a table showing correspondence information indicating correspondence among identification information of respective section image regions, color information of the respective section image regions, and paper sheet information indicating the kinds (colors) of paper sheets associated with the respective section image regions.

Based on image data of an image read by the image reading portion 2, the detecting portion 91 detects color information included in the image data. For example, it is assumed that the image read by the image reading portion 2 is a read image G1 as shown in FIG. 4. It is assumed that, as shown in FIG. 5, the read image G1 is composed of section image regions R1 to R4 which are sectioned by means of colors "light blue", "brown", "dark green", and "vermilion". At this time, based on mixing ratios of red (R), green (G), and blue (B) being three primary colors of color, the detecting portion 91 detects "light blue", "brown", "dark green", and vermilion".

The correspondence setting portion 92 sets correspondence between each of the plurality of section image regions R1 to R4 which are made by the read image G1, indicated by the image data read by the image reading portion 2, being sectioned based on the color information detected by the detecting portion 91, and the color of each of a plurality of paper sheets to be used in creation of the material M1. In the present embodiment, the correspondence setting portion 92 determines the colors of the plurality of paper sheets to be used in creation of the material M1, from among the colors indicated by the paper sheet information stored in the storage portion 40 in advance. At that time, for each of the section image regions R1 to R4, the correspondence setting portion 92 selects, from among the paper sheets of those colors, a paper sheet having a color that is the same as or most similar to the color of that section image region. For example, it is assumed that the colors of the paper sheets set in advance in the respective sheet feed cassettes 7 are "blue", "brown", "green", "red", "yellow", "white", "black", and "purple". In this case, the correspondence setting portion 92 selects the respective colors for the plurality of paper sheets to be used in creation of the material M1, from among the colors of the paper sheets set in advance in the respective sheet feed cassettes 7, and determines to use "blue" which is most similar to "light blue", "brown", "green" which is most similar to "dark green", and "red".

Then, the correspondence setting portion 92 sets the correspondence between the respective section image regions R1 to R4 and the colors determined as above. That is, in the present embodiment, the correspondence setting portion 92 associates the color of a section image region with a color that is the same as or most similar to the color of that section image region from among the determined colors of the paper sheets. In the case of the example described above, the correspondence setting portion 92 associates the section image region R1 with a "blue" paper sheet whose color is most similar to "light blue". Similarly, the correspondence setting portion 92 associates the section image region R2 with a "brown" paper sheet, associates the section image region R3 with a "green" paper sheet whose color is most similar to "dark green", and associates the section image region R4 with a "red" paper sheet whose color is most similar to "vermilion".

After the correspondence setting portion 92 has associated the respective section image regions R1 to R4 with the kinds (colors) of paper sheets in this manner, the correspondence setting portion 92 stores, in the storage portion 40, correspondence information indicating the correspondence among: identification information of the respective section image regions R1 to R4; color information of the respective section image regions R1 to R4 detected by the detecting portion 91; and paper sheet information indicating the kinds (colors) of paper sheets associated with the respective section image regions R1 to R4, in a form of a table.

In the present embodiment, based on a condition defined in advance, the piling order determining portion 93 determines a piling order for the case where paper sheets having the colors whose correspondence with the respective section image regions R1 to R4 has been set by the correspondence setting portion 92 are to be used in the material. Here, in the image processing apparatus 1 according to the present embodiment, as described above, the paper sheets having been subjected to printing are each discharged onto the discharge tray 45 with their printed surfaces facing upward, to be piled in order from the bottom on the discharge tray 45. Therefore, in the present embodiment, during creation of the material M1, the paper sheets are conveyed in order, starting with the paper sheet to be positioned at the lowest layer of the material M1, and then they are subjected to printing, to be discharged.

In the present embodiment, the condition defined in advance which determines the piling order of paper sheets is the order of magnitude of the distances between the center position of the read image G1 and the center positions of the respective section image regions, and in this condition, the farther an image of a section image region is from the center of the read image G1, the lower the layer of the paper sheet to express that image becomes. For example, in the read image G1 shown in FIG. 6, it is assumed that the distance from a center S of the read image G1 to a center of gravity K1 of the section image region R3 is a distance D1, the distance from the center S to a center of gravity K2 of the section image region R2 is a distance D2, and the distance from the center S to a center of gravity K3 of the section image region R4 is a distance D3. In addition, it is assumed that the distances D1 to D3 are in a relationship of D2<D1<D3. At this time, the piling order determining portion 93 determines the piling order such that, from lower layers upwards, a red paper sheet corresponding to the section image region R4 having the distance D3, a green paper sheet corresponding to the section image region R3 having the distance D1, and a brown paper sheet corresponding to the section image region R2 having the distance D2, in this order. In addition, the piling order determining portion 93 determines a blue paper sheet corresponding to the section image region surrounding the section image regions R2 to R4, as the uppermost layer.

Figure 6:
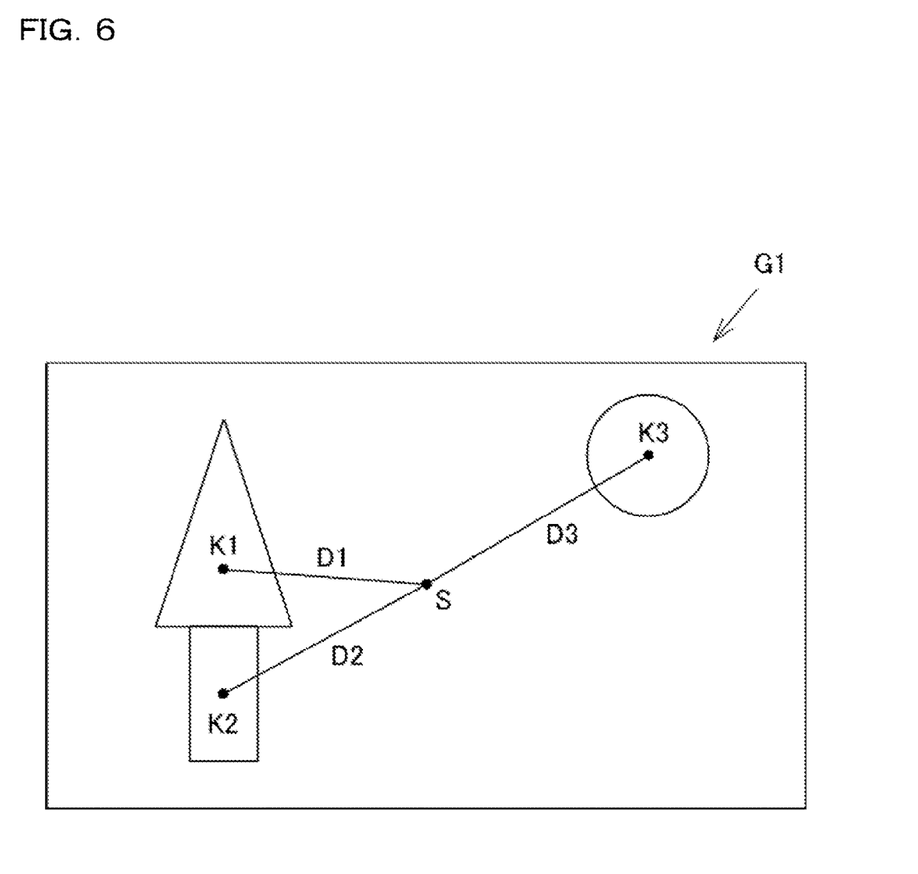
FIG. 6 is a diagram explaining a method for determining a piling order of paper sheets.

As described above, the correspondence setting portion 92 determines paper sheets having colors necessary for creating the material M1. In addition, the correspondence setting portion 92 determines which section image regions' images in the read image G1 are expressed by such paper sheets, respectively. Moreover, the piling order determining portion 93 determines in what order such paper sheets are conveyed and in what order the paper sheets are to be piled. In FIG. 6, in order to clearly show the centers of gravity K1 to K3 and the distances D1 to D3, hatching indicating the difference in colors in FIG. 4 is eliminated, and the borders of the section image regions are shown with lines, instead.

The print data generating portion 94 generates, for each paper sheet to be used in the material M1, print data that includes line images indicating cutting lines in accordance with the piling order defined based on the borders of the respective section image regions R2 to R4 and determined by the piling order determining portion 93. Specifically, using the border lines of the respective section image regions associated with the colors of respective paper sheets having lower positions in the piling order in the material M1 to be created, than the position in the piling order of a target paper sheet whose print data is to be generated, as the cutting lines for the target paper sheet, the print data generating portion 94 generates print data that includes line images indicating those cutting lines. The generated print data is stored in the storage portion 40 until an image forming operation is performed by the image forming portion 5.

Figure 7A:
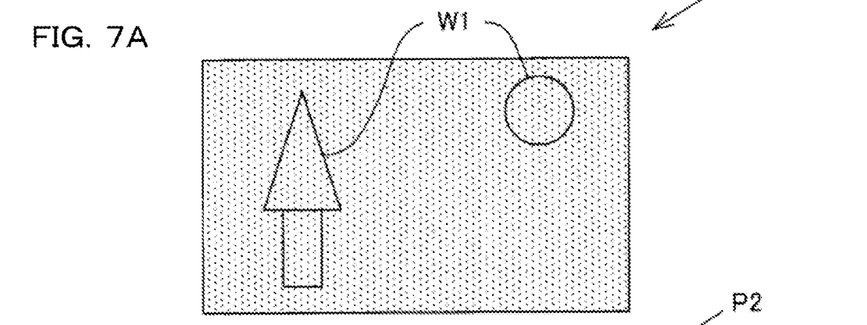
FIG. 7A to FIG. 7D are examples of images indicated by print data that includes line images generated for each of paper sheets composing the material to be created.

For example, as shown in FIG. 7A, for a paper sheet P1 to be positioned at the uppermost layer, the print data generating portion 94 sets, as cutting lines W1, the respective borders of the section image regions R2 to R4 respectively corresponding to paper sheets P2 to P4 to be positioned at lower layers than the layer of the paper sheet P1 in the material M1 to be created. Then, the print data generating portion 94 generates image data of the cutting lines W1 as print data.

Figure 7B:
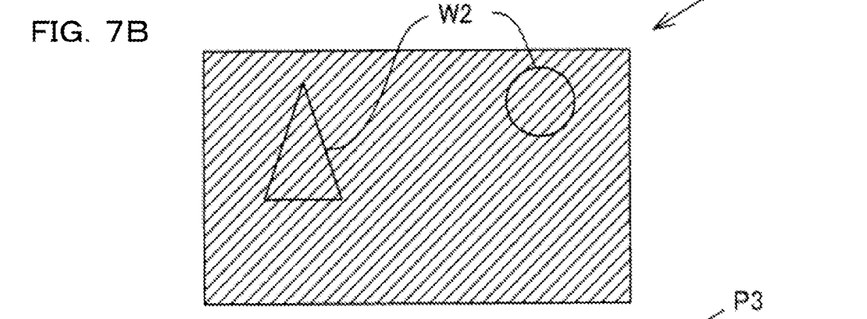

As shown in FIG. 7B, for the paper sheet P2 to be positioned at the immediately lower layer than the layer of the paper sheet P1, the print data generating portion 94 sets, as cutting lines W2, the respective borders of the section image regions R3 and R4 respectively corresponding to the paper sheets P3 and P4 to be positioned at lower layers than the layer of the paper sheet P2 in the material M1 to be created. Then, the print data generating portion 94 generates image data of the cutting lines W2 as print data.

Figure 7C:
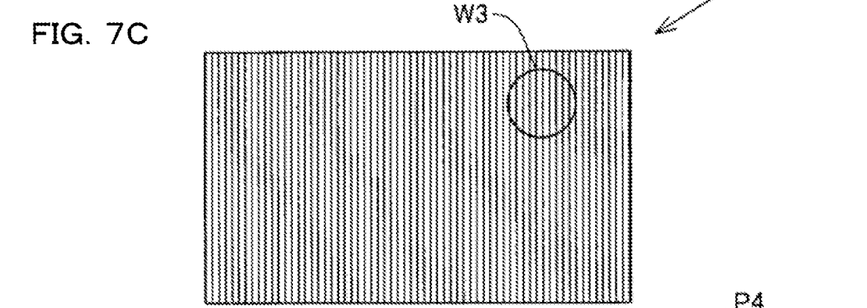

As shown in FIG. 7C, for the paper sheet P3 to be positioned at the immediately lower layer than the layer of the paper sheet P2, the print data generating portion 94 sets, as a cutting line W3, the border of the section image region R4 corresponding to the paper sheet P4 to be positioned at the lower layer than the layer of the paper sheet P3 in the material M1 to be created. Then, the print data generating portion 94 generates image data of the cutting line W3 as print data.

Figure 7D:
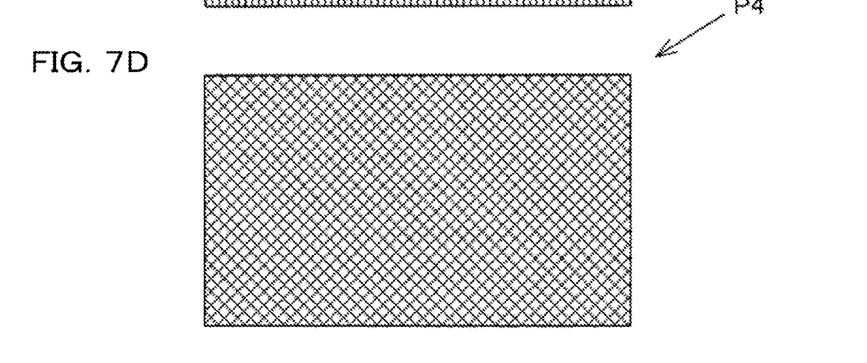

For the paper sheet P4 to be positioned at the immediately lower layer than the layer of the paper sheet P3, there is no paper sheet to be positioned in a lower layer than the layer of the paper sheet P4, and this paper sheet P4 is the paper sheet at the lowest layer. Therefore, as shown in FIG. 7D, the print data generating portion 94 does not set any cutting line for the paper sheet P4. Accordingly, the print data generating portion 94 does not generate print data for the paper sheet P4.

Figure 8:
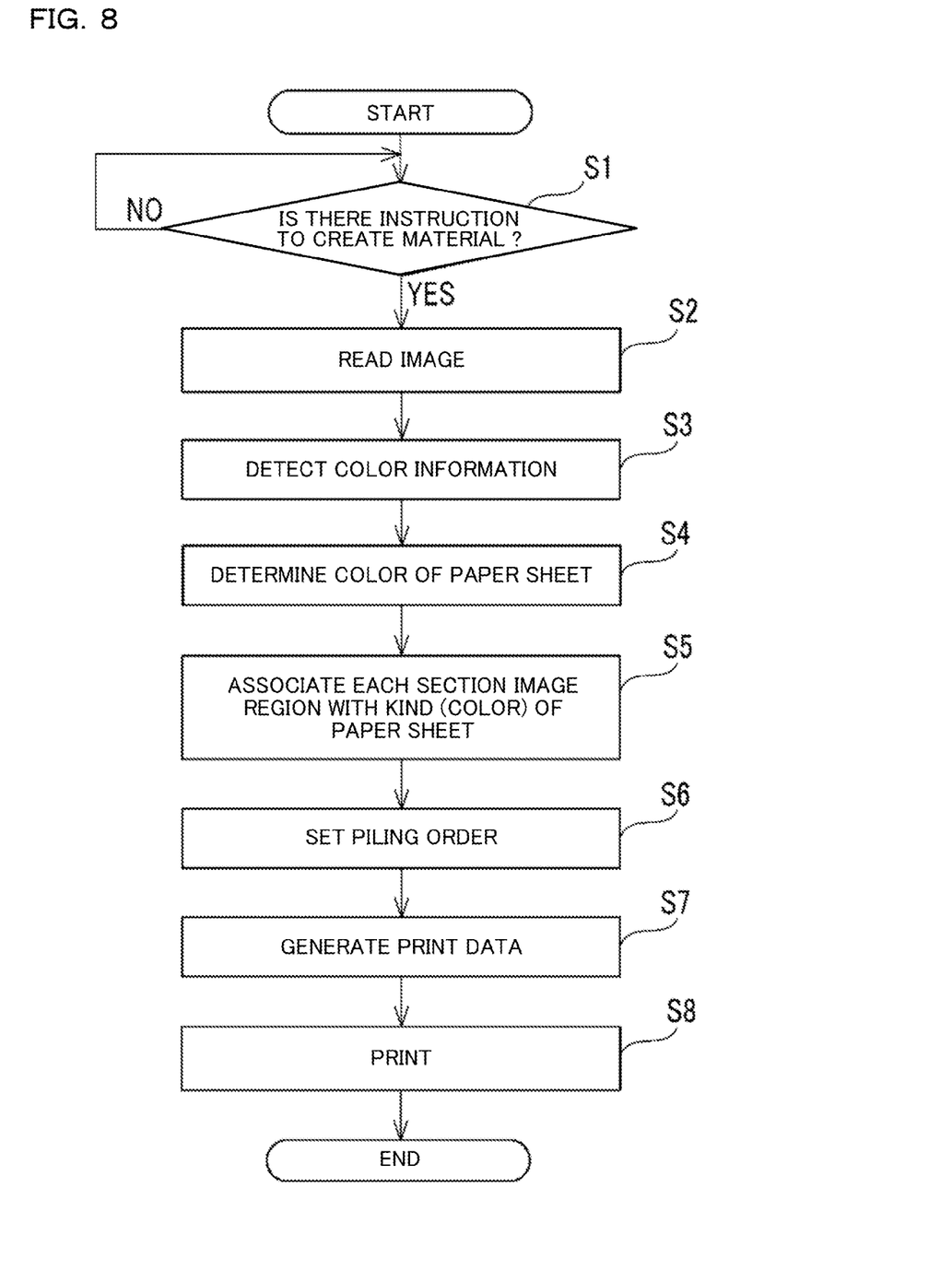
FIG. 8 is a flow chart of a material creation process performed by a control portion.

Next, a material creation process performed by the control portion 9 will be described. FIG. 8 is a flow chart of the material creation process. The material creation process is executed when, for example, a material creation mode is selected and an instruction to start execution of that mode is inputted. In the flow chart shown in FIG. 8, steps S1, S2, and the like represent the process procedure (step) numbers, respectively.

When there is an instruction to start execution of the material creation mode, i.e., an instruction to create the material M1 (YES in step S1), the control portion 9 causes the image reading portion 2 to perform an operation of reading an image (step S2). Next, the detecting portion 91 of the control portion 9 detects color information from image data of the image read by the image reading portion 2 (step S3). Then, based on the color information detected by the detecting portion 91, the correspondence setting portion 92 of the control portion 9 determines the respective colors for the plurality of paper sheets to be used in creation of the material M1 (step S4).

Next, the correspondence setting portion 92 associates the determined colors with the respective section image regions which are made by the read image being sectioned based on the color information detected by the detecting portion 91 (step S5). The piling order determining portion 93 of the control portion 9 determines a piling order of the paper sheets having the colors determined by the correspondence setting portion 92 such that the farther a section image region is from the center of the read image G1, the lower the layer of the paper sheet to express that section image region becomes (step S6). Then, the print data generating portion 94 of the control portion 9 generates, for each of the paper sheets composing the material M1 to be created, print data of the image including cutting lines (step S7).

Figure 9A:
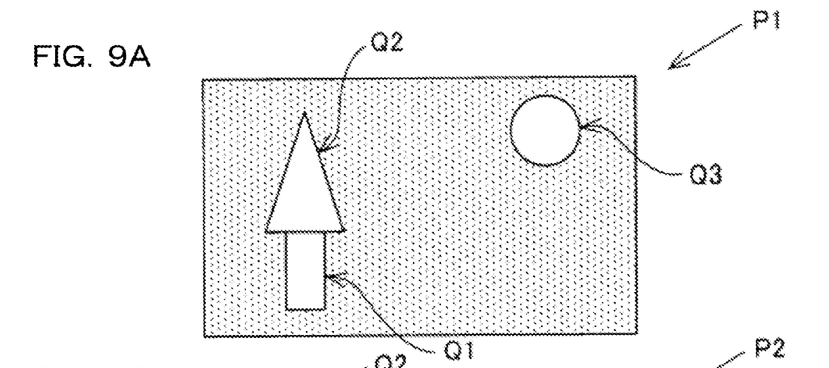
FIG. 9A to FIG. 9D each show a state where a paper sheet of a created material having been cut out along cutting lines.
Figure 9B:
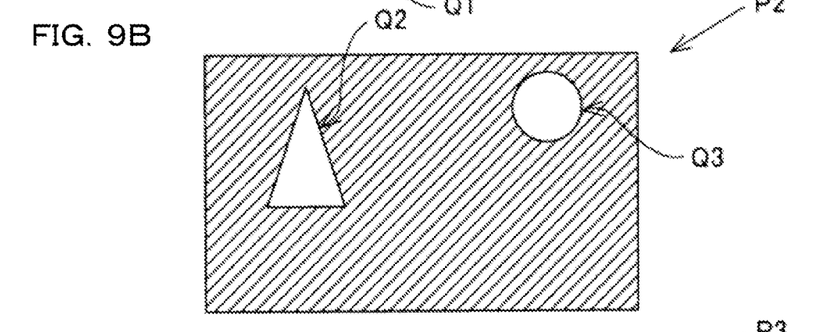
Figure 9C:
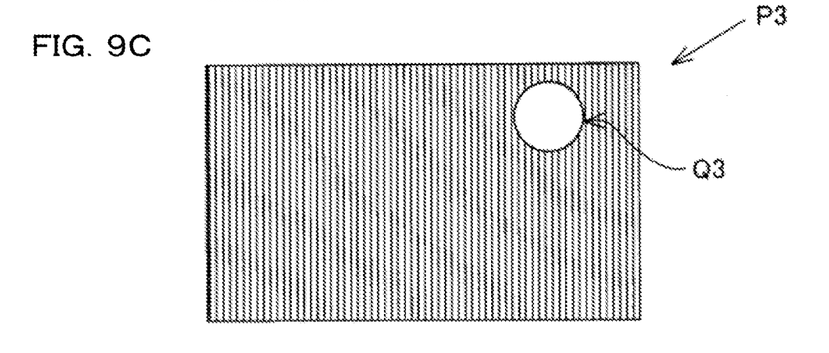
Figure 9D:
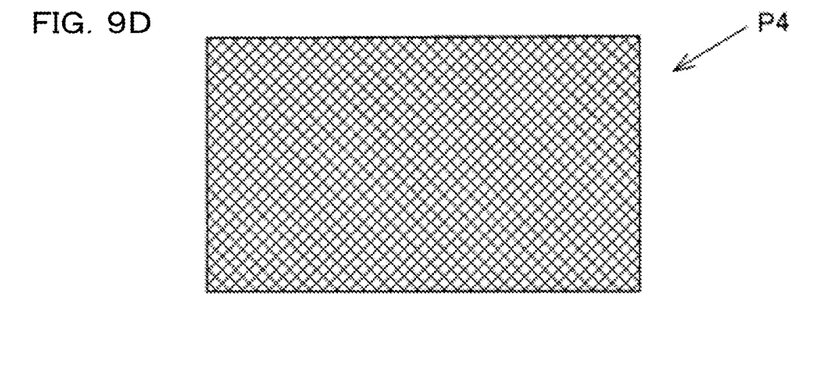

Then, the control portion 9 causes the image forming portion 5 to execute formation of the line image indicating cutting lines based on the print data generated by the print data generating portion 94, in accordance with the piling order determined by the piling order determining portion 93 (step S8). Accordingly, the paper sheets P1 to P4 as shown in FIG. 7A to FIG. 7D are generated, and the material M1 in which the paper sheets P1, P2, P3, and P4 are piled from upper layers in this order is created. FIG. 9 shows states where the paper sheets P1 to P4 of the created material M1 having been cut out along the cutting lines W1 to W3, respectively. As seen from FIG. 9, in the square portion pointed at by an arrow Q1 in FIG. 9A, the ground color of the paper sheet P2 in FIG. 9B is exposed. That is, the square portion is expressed by the paper sheet P2. In the triangular portion pointed at by an arrow Q2 in FIG. 9A and FIG. 9B, the ground color of the paper sheet P3 in FIG. 9C is exposed. That is, the triangular portion is expressed by the paper sheet P3. In the round portion pointed at by an arrow Q3 in FIG. 9A to FIG. 9C, the ground color of the paper sheet P4 in FIG. 9D is exposed. That is, the round portion is expressed by the paper sheet P4.

As described above, the user can easily create a desired material M1 by use of the image processing apparatus 1. Accordingly, the present disclosure can contribute to making the art of producing a three-dimensional colorful piece of work by partially cutting out each paper sheet of a material made by a plurality of kinds of paper sheets having different colors and/or densities being piled, easily enjoyable for the user.

A preferred embodiment of the present disclosure has been described. However, the present disclosure is not limited to the contents described above, and various types of modifications can be made.

In the above embodiment, the correspondence setting portion 92 associates the color of a section image region with a color that is the same as or most similar to the color of that section image region from among the determined colors of paper sheets. However, the rule of associating the color of a section image region with the color of a paper sheet is not limited thereto. That is, it is not necessarily required that the color of a paper sheet to be associated with the color of a section image region is a color that is the same or most similar to the color of that section image region. For example, when the color of a section image region is red, the color of a paper sheet may be set to blue, and when the color of a section image region is yellow, the color of a paper sheet may be set to red. In this case, the correspondence setting portion 92 stores in advance preset correspondence between the colors of section image regions and the colors of paper sheets, and when the color of a section image region is detected, the correspondence setting portion 92 associates a paper sheet having a color corresponding to that color with that section image region.

The determination condition (the condition defined in advance) to be used when the piling order determining portion 93 determines a piling order of paper sheets having colors that have been determined by the correspondence setting portion 92, is not limited to the order of magnitude of distances between the center S of the read image G1 and the centers of gravity of the respective section image regions. For example, the condition defined in advance may be the order of magnitude of the areas of the respective section image regions, or may include both of the order of magnitude of the areas of the respective section image regions and the distances between the center S of the read image G1 and the centers of gravity of the respective section image regions. Alternatively, the piling order may be defined in advance for each color.

In a case where a post-processing device which staples printed paper sheets is provided in the image processing apparatus 1, the post-processing device may staple the piled paper sheets. This eliminates scatter of piled paper sheets in the cutting out operation, or missing of any paper sheet in the cutting out operation, and thus, can improve the operability.

In the above embodiment, based on image data of an image read by the image reading portion 2, the detecting portion 91 detects color information from the image data. However, in a case where the image processing apparatus 1 is provided with paper sheets of the same color having different densities, and there are a plurality of section image regions of the same color having different densities, the detecting portion 91 may detect density information instead of the color information. That is, based on image data of an image read by the image reading portion 2, the detecting portion 91 may detect density information from the image data. In this case, the correspondence setting portion 92 sets correspondence between each of the plurality of section image regions R1 to R4 which are made by the read image G1, indicated by the image data read by the image reading portion 2, being sectioned based on the color information detected by the detecting portion 91, and the density of each of the plurality of paper sheets to be used in creation of the material M1. Here, the correspondence setting portion 92 determines the respective densities of the plurality of paper sheets to be used in creation of the material M1, based on the density information detected by the detecting portion 91. Further, the storage portion 40 may have paper sheet information stored therein in advance, the paper sheet information being of a plurality of kinds of paper sheets having different densities provided in the image processing apparatus 1. The correspondence setting portion 92 may determine the respective densities of the plurality of paper sheets to be used in creation of the material, from among the densities of the paper sheets indicated by the paper sheet information stored in advance in the storage portion 40. Then, based on a condition defined in advance, the piling order determining portion 93 determines a piling order for the case where paper sheets having the densities whose correspondence with the respective section image regions R1 to R4 has been set by the correspondence setting portion 92 are to be used in the material. Using the border lines of the respective section image regions associated with the densities of respective paper sheets having lower positions in the piling order in the material M1 to be created, than the position in the piling order of a target paper sheet whose print data is to be generated, as the cutting lines for the target paper sheet, the print data generating portion 94 generates print data that includes line images indicating those cutting lines.

Based on image data of the image read by the image reading portion 2, the detecting portion 91 may detect color information and density information from the image data. In this case, the correspondence setting portion 92 sets correspondence between each of the plurality of section image regions R1 to R4 which are made by the read image G1, indicated by the image data read by the image reading portion 2, being sectioned based on the color information and the density information detected by the detecting portion 91, and the color and the density of each of a plurality of paper sheets to be used in creation of the material M1. Here, the correspondence setting portion 92 determines the respective colors and densities of a plurality of paper sheets to be used in creation of the material M1, based on the color information and the density information detected by the detecting portion 91. Further, the storage portion 40 may have paper sheet information stored therein in advance, the paper sheet information being of a plurality of kinds of paper sheets having different colors and densities provided in the image processing apparatus 1. Then, the correspondence setting portion 92 may determine the respective colors and densities of the plurality of paper sheets to be used in creation of the material, from among the colors and densities of the paper sheets indicated by the paper sheet information stored in advance in the storage portion 40. Then, based on a condition defined in advance, the piling order determining portion 93 determines a piling order for the case where paper sheets having the colors and densities whose correspondence with the respective section image regions R1 to R4 has been set by the correspondence setting portion 92 are to be used in the material. Using the border lines of the respective section image regions associated with the colors and densities of respective paper sheets having lower positions in the piling order in the material M1 to be created, than the position in the piling order of a target paper sheet whose print data is to be generated, as the cutting lines for the target paper sheet, the print data generating portion 94 generates print data that includes line images indicating those cutting lines.

In a case where the color of a section image region is a color of a paper sheet that is not set in the image processing apparatus 1, a solid image of the color of that section image region may be printed with toner, in the region other than the cutting lines of any one of the paper sheets prepared in advance in the image processing apparatus 1. In this case, as the print data for that paper sheet, the print data generating portion 94 generates data that includes line image data of the cutting lines and solid image data for painting solid the regions other than the regions of the cutting lines with the color determined by the correspondence setting portion 92 for that paper sheet. In a case where the density of a section image region is the density of a paper sheet that is not set in the image processing apparatus 1, a solid image having the density of that section image region may be printed with toner, in the region other than the cutting lines of any one of the paper sheets prepared in advance in the image processing apparatus 1. In this case, as the print data for that paper sheet, the print data generating portion 94 generates data that includes line image data of the cutting lines and solid image data for painting solid the region other than the regions of the cutting lines at the density determined by the correspondence setting portion 92 for that paper sheet. In other words, in a case where paper sheet information of a paper sheet having either one or both of a color and a density set by the correspondence setting portion 92 does not exist in the storage portion 40, the print data generating portion 94 may generate print data that includes the line images and a solid image indicated by either one or both of the color and the density set by the correspondence setting portion 92 for the entirety of that paper sheet. In this case, the most preferable color of the paper sheet is white.

In the above embodiment, paper sheets having been subjected to printing are each discharged onto the discharge tray 45 with their printed surfaces facing upward, to be piled in order from the bottom on the discharge tray 45. Therefore, during creation of the material M1, the paper sheets are conveyed in order, starting with the paper sheet to be positioned at the lowest layer of the material M1, and then they are subjected to printing, to be discharged. However, in a case of an image processing apparatus configured such that paper sheets having been subjected to printing are each discharged onto the discharge tray 45 with their printed surfaces facing downward, to be piled in order from the bottom on the discharge tray 45, the paper sheets are conveyed in order, starting with the paper sheet to be positioned at the uppermost layer of the material M1, and then they are subjected to printing, to be discharged, during creation of the material M1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus configured to create a material in a form of a stack made by a plurality of paper sheets being piled so as to be used in production of a piece of work, the piece of work being made by each of the plurality of paper sheets being cut out along cutting lines formed thereon, the image processing apparatus comprising:
an image reading portion configured to optically read a document sheet and generate image data for the document sheet;
an image forming portion; and
a processor, configured to execute:
a detecting portion operatively coupled to the image reading portion and configured to detect, based on the image data read by the image reading portion, at least one of color information and density information included in the image data;
a correspondence setting portion operatively coupled to the image reading portion and configured to set correspondence between each of a plurality of section image regions which are made by an image, indicated by the image data, being sectioned based on the information detected by the detecting portion, and either one or both of a color and a density of each of a plurality of paper sheets to be used in creation of the material;
a piling order determining portion operatively coupled to the image forming portion and configured to determine, based on a condition defined in advance, a piling order for a case where paper sheets having either one or both of the colors and the densities whose correspondence with the respective section image regions has been set by the correspondence setting portion are to be used in the material; and
a print data generating portion operatively coupled to the image forming portion and configured to generate, for each paper sheet to be used in the material, print data that includes line images indicating cutting lines in accordance with the piling order defined based on borders of the respective section image regions and determined by the piling order determining portion, wherein
the image forming portion is configured to form, on the paper sheets, the line images based on the print data generated by the print data generating portion in accordance with the piling order determined by the piling order determining portion.

2. The image processing apparatus according to claim 1, wherein
using border lines of the respective section image regions whose correspondence has been set, the correspondence being with either one or both of the colors and densities of respective paper sheets having lower positions in the piling order in the material to be created, than a position in the piling order of a target paper sheet whose print data is to be generated, as the cutting lines for the target paper sheet, the print data generating portion generates print data that includes line images indicating those cutting lines.

3. The image processing apparatus according to claim 1, further comprising:

a storage portion operatively coupled to the correspondence setting portion and configured to have paper sheet information stored therein in advance, the paper sheet information being of a plurality of kinds of paper sheets which are different in either one or both of colors and densities, wherein the correspondence setting portion sets, from among either one or both of the colors and the densities of the paper sheets indicated by the paper sheet information stored in advance in the storage portion, either one or both of colors and densities of the plurality of paper sheets to be used in creation of the material.

4. The image processing apparatus according to claim 3, wherein in a case where paper sheet information of a paper sheet having either one or both of a color and a density set by the correspondence setting portion does not exist in the storage portion, the print data generating portion generates print data that includes the line images and a solid image indicated by either one or both of the color and the density set by the correspondence setting portion for an entirety of that paper sheet.

5. The image processing apparatus according to claim 1, wherein the condition defined in advance includes an order of magnitude of distances between a center position of the image indicated by the image data and center positions of the respective section image regions.

6. The image processing apparatus according to claim 1, wherein the condition defined in advance includes an order of magnitude of areas of the respective section image regions.

* * * * *